Jan. 20, 1959

V. A. MISEK 2,870,415

SATURABLE MAGNETIC MODULATOR

Filed June 3, 1955

Victor A. Misek
*INVENTOR.*

BY Richard P. Schulze

Attorney

United States Patent Office 2,870,415
Patented Jan. 20, 1959

2,870,415

SATURABLE MAGNETIC MODULATOR

Victor A. Misek, Nashua, N. H., assignor, by mesne assignments, to Sanders Associates, Incorporated, Nashua, N. H., a corporation of Delaware Application June 3, 1955, Serial No. 512,981

3 Claims. (Cl. 332—51)

This invention relates to magnetic modulators. More particularly, the present invention relates to balanced magnetic modulators providing suppressed carrier modulation.

Prior art balanced modulators utilizing vacuum tubes, selenium rectifiers, crystal diodes and the like, are inherently limited in operation, in power handling capacity, frequency response and reliability.

It is therefore an object of the present invention to provide an improved balanced magnetic modulator for producing suppressed carrier modulation.

A further object of the invention is to provide an improved balanced magnetic modulator utilizing saturable ferromagnetic cores.

Other and further objects of the invention will be apparent from the following description of a preferred embodiment, taken in connection with the accompanying drawings.

In accordance with the invention there is provided a balanced magnetic modulator. A carrier-signal generator provides a carrier frequency signal. A transformer has a primary winding coupled to the generator and a secondary winding with a center tap terminal. A pair of series-connected coils are provided each surrounding a saturable magnetic core with a common junction terminal between them. An end of one of the coils is connected to the other end of the secondary. The other end of the bias means is connected to the other end of the coils. The combination thus provides means for applying a unidirectional bias magnetic flux through the cores of a magnitude substantially insufficient to saturate the cores. A modulation impedance has one end connected to the junction terminals between the coils. A modulation signal generator is connected between the other end of the modulation impedance and the center tab terminal of the secondary to apply a modulation frequency signal to the coils in parallel and in series opposition. The result is that the combination of the signals and bias flux produces a resultant magnetic flux to saturate only one of the cores at substantially the carrier frequency.

Figure 1:
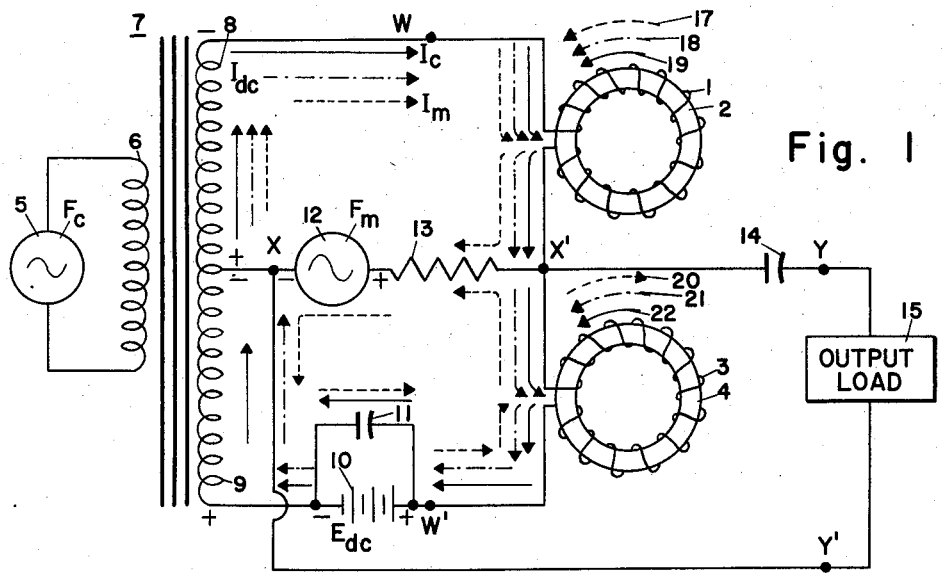
Fig. 1 is a schematic circuit diagram of a balanced magnetic modulator embodying the present invention.

Referring now to the drawings, and with particular reference to Fig. 1, the preferred embodiment of the instant invention balanced magnetic modulator of the instant invention comprises a first saturable reactor having a coil 1 surrounding a saturable, annular core 2 formed, for example from Supermalloy material as manufactured by Arnold Engineering Company of Marengo, Illinois. A second saturable reactor has a coil 3 surrounding a saturable core 4 and is identical to the first reactor. The cores 2 and 4 provide two magnetic paths for magnetic flux from magnetizing forces produced by current flow in the coils 1 and 3. A carrier frequency $F_c$ signal generator 5 is connected to the primary winding 6 of the transformer generally indicated at 7. The secondaries 8 and 9 are connected to the coils 1 and 3 in series as shown with a source 10 of direct voltage $E_{dc}$. A capacitor 11 is connected in parallel with the source 10 to by-pass alternating current. A modulation frequency $F_m$ signal generator 12 is connected in series with an impedance, for example the resistor 13, between a common junction point X between the secondary windings 8 and 9 and a junction point X' between the coils 1 and 3 as shown. A capacitor 14 couples the output of the modulator to an output load 15 connected between output terminals Y and Y'. The common junction point X and the terminal Y' are connected together as shown. The capacitor 14, in combination with the output load, for example a resistor of a suitable value, comprise a high-pass filter.

Figure 2:
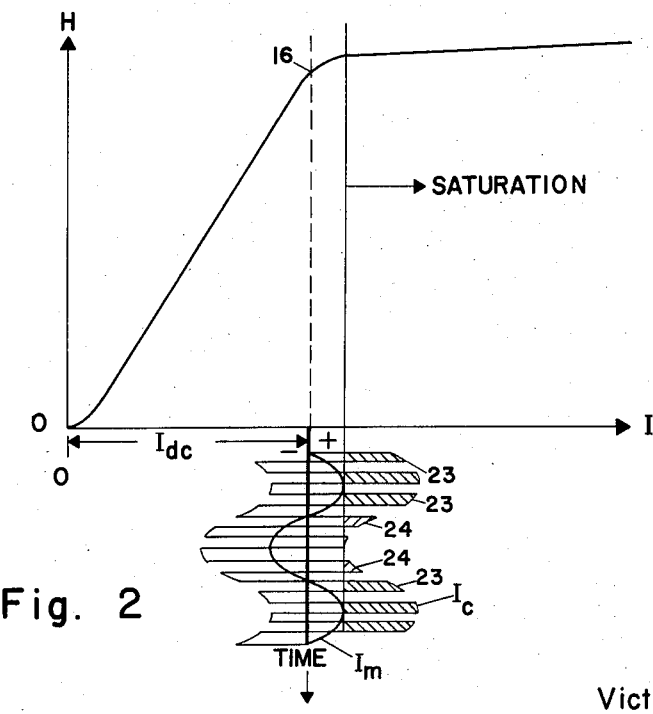
Fig. 2 is a graph illustrating an aspect of the operation of the modulator in Fig. 1.
Figure 3:
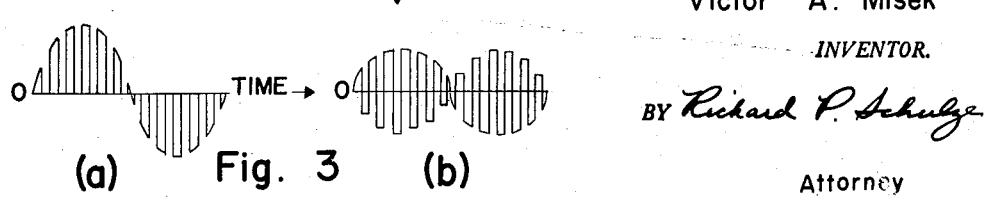
Fig. 3 is a pair of voltage wave form curves associated with the output of the modulator in Fig. 1.

The operation of the modulator in Fig. 1 will now be described with further reference to Figs. 2 and 3. The graph of Fig. 2 illustrates the amplitude of magnetic flux H in one of the cores 2 and 4 as provided by magnetizing forces produced by current flow in its corresponding coil 1 or 3. In the preferred mode of operation, a magnitude of bias current $I_{dc}$ is so chosen as to produce a magnitude of magnetic flux in the core corresponding to the knee 16 as shown in the curve in Fig. 2. Assuming the resistance in circuit comprising the transformer secondaries 8 and 9 and the coils 1 and 3 is 100 ohms, the source 10 must provide 6 volts to produce a direct current of 60 milliamperes required to reach the degree of saturation represented by the knee 16 of the curve in Fig. 2. At a frequency, for example, of 400 cycles, the transformer secondaries 8 and 9 apply a carrier frequency signal of 6 volts peak amplitude to the coils 1 and 3. The modulation frequency signal generator 12 provides an output peak voltage of 3 volts at a frequency, for example of 60 cycles, to the coils 1 and 3. In Fig. 2 the curve representing the carrier frequency signal current relative to time is labeled $I_c$ and the modulation signal current is labeled $I_m$. In the preferred mode of operation the combination of the bias current $I_{dc}$ and the carrier current $I_c$ is sufficient to saturate both cores in like degree when no modulation is present. When a modulation signal is introduced in accordance with the polarities as indicated in Fig. 1, the currents $I_c$, $I_{dc}$ and $I_m$ have the directions as indicated by the solid arrows, dashed-dot arrows and dashed arrows, respectively indicated.

It will be apparent that a reactance bridge is provided which comprises four arms connected together to provide two pairs of conjugate points. The secondary windings 8 and 9 comprise two arms of the bridge connected between one pair of conjugate points W and W' in series. The coils 1 and 3 comprise the other two arms of the bridge connected in series between the points W and W'. The junction X between the secondary windings 8 and 9 and the junction X' between the coils 1 and 3 comprise the other pair of conjugate points.

With the polarities as shown, the current $I_{dc}$ provides a unidirectional magnetizing force to produce a magnetic flux in the core 2 in the direction as indicated by the dash-dot arrow 18. The direction of the fluxes in the core 2 produced by the alternating magnetizing forces provided by currents $I_m$ and $I_c$ are indicated by the dashed arrow 17 and the solid arrow 19, respectively, as shown. The fluxes produced by the currents $I_m$, $I_{dc}$ and $I_c$ in the core 4 are indicated by the dashed arrow 20, the dash-dot arrow 21 and the solid arrow 22, respectively, The voltage across the points X'—X is determined by the effective impedances in the parallel circuits provided by the coil 1 and the secondary winding 8 on the one hand and the coil 3 and the secondary winding 9 on the other. The time that the magnetic path corresponding to the core 1 is saturated is indicated by the shaded areas 23 of the curve $I_c$ in Fig. 2. With the polarities as shown it is clear that the average time that the core 1 is saturated is much greater than when the current $I_m$ reverses itself and goes negative as indicated by the shaded areas 24 in the curve $I_c$. Since the current $I_m$ is co-linear with the currents $I_c$ and $I_{dc}$ in the coil 1 with the polarities as shown and in opposition to the currents $I_c$ and $I_{dc}$ in the coil 3, it will be apparent that the cores 2 and 4 are differentially saturated over a given half cycle of the modulation current $I_m$. When the polarity of the modulation signal reverses the core 4 is saturated for an average time greater than that of the core 2. Hence, the modulation magnetic force produced by the current $I_m$ so aids the bias magnetic force produced by the current $I_{dc}$ in one of the magnetic paths and so opposes the bias source in the other of the magnetic paths as to alternately, differentially saturate the paths during successive half cycles of the modulation frequency force.

As is well known in the art, a saturated reactor provides an extremely low impedance to alternating current. Here the voltage across the points X'—X is equal to the amplitude of the modulation signal when a high impedance to alternating current is provided in parallel as is true during the time the cores 2 and 4 are unsaturated. During the period of saturation, however, the impedance between the points X'—X becomes very low. The effect of successively saturating the cores 2 and 4 is to produce voltage pulses at the carrier frequency, as illustrated in the curve (a) of Fig. 3, appearing across the points X'—X. The pulses are amplitude modulated in accordance with the modulation frequency, phase reversals occurring every 180° as shown. The voltages indicated by the curve (a) of Fig. 3 may be averaged by passing the output of the modulator through a high-pass filter such as is represented by the capacitor 14 in combination with the output load 15. It will be noted that the output signals appearing across the load 15 are characterized by the information-carrying sideband frequencies equal to the sum of the carrier and modulation frequencies $F_c+F_m$ and the difference between them, $F_c-F_m$. The input carriers $F_c$ and $F_m$ are each suppressed by as much as −60 db relative to the sideband frequency signals. The familiar balanced modulator output wave form thus provided is illustrated in the curve (b) of Fig. 3.

The configuration of the cores 2 and 4 may be greatly varied. For example, conventional bar cores may be utilized as well as "E" cores without substantially disturbing the operability of the modulator. The device as described and illustrated is useful with modulation frequencies ranging from 0 to 10 megacycles per second and more, and carrier frequencies from the sub-sonic to the microwave region.

Balanced modulation takes place as a result of the non-linearity presented by the differential saturation of the cores 2 and 4. Several modes of operation are then possible. For example, the magnitudes of the bias carrier and modulation signals may be so chosen that saturation of a core takes place only as a result of a combination of the three signals acting co-linearly. This condition is readily realized by reducing the bias current $I_{dc}$ to a point where the maximum variation of the carrier current $I_c$ does not cause the cores 2 and 4 to saturate without the presence of the modulation current $I_m$.

In another mode of operation, a combination of any two of the currents is sufficient to saturate the cores 2 and 4. In Fig. 2, for example, the combination of the bias current $I_{dc}$ and the carrier current $I_c$ is sufficient to saturate both cores 2 and 4 all of the time without the aid of the modulation current $I_m$.

In a third mode of operation, the amplitude of the carrier current is sufficiently great to saturate the cores 2 and 4 without the aid of either the bias current $I_{dc}$ or the modulation current $I_m$.

In an embodiment actually constructed and tested, the transformer consisted of a standard 60 cycle center tapped 115 to 6.3 volt filament transformer, the coils 1 and 3 consisted of 40 turns of #18 insulated wire, the cores 2 and 4 were 3 inches in diameter with a rectangular cross-section ½ x ¾ inches, the resistor 13 was 100 ohms, the capacitor 11 was 40 microfarads as used in a conventional rectifier supply, the capacitor 14 was 10 microfarads and the output load a resistor of 100,000 ohms.

The present invention marks an important step forward in the art of balanced modulation. The magnetic modulator of the present invention provides balanced modulation with a degree of reliability, simplicity and economy unattainable with the prior art vacuum tube, selenium rectifier and crystal diode rectifier devices.

While there has been hereinbefore described what is at present considered a preferred embodiment of the invention, it will be apparent that many and various changes and modifications may be made with respect to the embodiment illustrated, without departing from the spirit of the invention. It will be understood, therefore, that all such changes and modifications as fall fairly within the scope of the present invention, as defined in the appended claims, are to be considered as a part of the present invention.

What is claimed is:

1. A balanced magnetic modulator, comprising: a carrier signal generator for providing a carrier frequency signal; a transformer having a primary winding coupled to said generator and a secondary winding having a center-tapped terminal; a pair of series-connected coils each surrounding a saturable magnetic core with a common junction terminal between them and an end of one of said coils being connected to an end of said secondary for producing an alternating carrier frequency magnetic flux in said cores; unidirectional bias current means connected in series with said coils and said secondary, an end of said bias means being connected to the other end of said secondary, the other end of said bias means being connected to the other end of said coils, for applying a unidirectional bias magnetic flux through said cores of a magnitude substantially insufficient to saturate said cores; a modulation impedance having one end connected to said junction terminals between said coils; and a modulation signal generator connected between the other end of said modulation impedance and said center-tapped terminal of said secondary to apply a modulation frequency signal to said coils in parallel and in series opposition, whereby the combination of said signals and bias flux produces a resultant magnetic flux to saturate only one of said cores at substantially said carrier frequency.

2. A balanced magnetic modulator, comprising: a carrier signal generator for providing a carrier frequency signal; a transformer having a primary winding coupled to said generator and a secondary winding having a center-tapped terminal; a pair of series-connected coils each surrounding a saturable magnetic core with a common junction terminal between them and an end of one of said coils being connected to an end of said secondary for producing an alternating carrier frequency magnetic flux in said cores; unidirectional bias current means connected in series with said coils and said secondary, an end of said bias means being connected to the other end of said secondary, the other end of said bias means being connected to the other end of said coils, for applying a unidirectional bias magnetic flux through said cores of a magnitude substantially insufficient to saturate said cores; a modulation impedance having one end connected to said junction terminals between said coils; a modulation signal generator connected between the other end of said modulation impedance and said center-tapped terminal of said secondary to apply a modulation frequency signal to said coils in parallel and in series opposition, whereby the combination of said signals and bias flux produces a resultant magnetic flux to saturate only one of said cores at substantially said carrier frequency; and a high-pass filter coupling said coils to an output load whereby output signals are characterized by the sum of said carrier and modulation frequencies and the difference between said carrier and modulation frequencies.

3. A balanced magnetic modulator, comprising: a carrier signal generator for providing a carrier frequency signal; a transformer having a primary winding coupled to said generator and a secondary winding having a center-tapped terminal; a pair of series-connected coils each surrounding a saturable magnetic core with a common junction terminal between them and an end of one of said coils being connected to an end of said secondary for producing an alternating carrier frequency magnetic flux in said cores; unidirectional bias current means connected in series with said coils and said secondary, an end of said bias means being connected to the other end of said secondary, the other end of said bias means being connected to the other end of said coils, for applying a unidirectional bias magnetic flux through said cores of a magnitude substantially insufficient to saturate said cores; and a modulation signal generator means connected between said junction terminal and said center-tapped terminal.

References Cited in the file of this patent

UNITED STATES PATENTS

| | | |
|---|---|---|
| 1,635,859 | Kuhn | Dec. 27, 1927 |
| 2,304,135 | Wise | Dec. 8, 1942 |
| 2,392,758 | Minton et al. | Jan. 8, 1946 |
| 2,585,654 | Hewlett | Feb. 12, 1952 |
| 2,781,420 | Eno | Feb. 12, 1957 |